United States Patent
Isaka

(10) Patent No.: US 10,108,023 B2
(45) Date of Patent: Oct. 23, 2018

(54) LENS APPARATUS, OPTICAL APPARATUS, DRIVING APPARATUS, AND IMAGE PICKUP APPARATUS INCLUDING THE SAME

(71) Applicant: CANON KABUSHIKI KAISHA, Tokyo (JP)

(72) Inventor: Mitsuhiro Isaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 14/873,463

(22) Filed: Oct. 2, 2015

(65) Prior Publication Data
US 2016/0109718 A1    Apr. 21, 2016

(30) Foreign Application Priority Data
Oct. 21, 2014    (JP) .................. 2014-214302

(51) Int. Cl.
G02B 27/64    (2006.01)

(52) U.S. Cl.
CPC .................. G02B 27/646 (2013.01)

(58) Field of Classification Search
CPC .... G02B 7/005; G02B 7/1827; G02B 27/646; G02B 27/64
USPC .................................. 359/555–559
See application file for complete search history.

(56) References Cited

U.S. PATENT DOCUMENTS 9,106,880 B2 *    8/2015    Ohtsuka ................. H04N 5/772
2015/0130956 A1    5/2015    Ohashi et al.

FOREIGN PATENT DOCUMENTS

JP    2002268107 A  *    9/2002
JP    2014014256 A        1/2014

* cited by examiner

*Primary Examiner* — Darryl J Collins
*Assistant Examiner* — Journey Sumlar
(74) *Attorney, Agent, or Firm* — Rossi, Kimms & McDowell LLP

(57)    ABSTRACT

Provided is a lens driving apparatus, including: an ultrasonic motor including a drive slider having an output shaft provided so as to project in a direction perpendicular to a driving direction of the drive slider; a lens moving frame configured to hold an optical system, and having a hole into which the output shaft is to be inserted; and a fixed portion configured to support the lens moving frame so that the lens moving frame is movable in a direction perpendicular to an optical axis, hold the ultrasonic motor so that the ultrasonic motor is removable from a side opposite to a side where the lens moving frame is provided, and have a through hole passing through the fixed portion in a direction of the optical axis.

10 Claims, 7 Drawing Sheets

LENS APPARATUS, OPTICAL APPARATUS, DRIVING APPARATUS, AND IMAGE PICKUP APPARATUS INCLUDING THE SAME

BACKGROUND OF THE INVENTION

Field of the Invention

The present invention relates to a lens driving apparatus, and more particularly, to an image blur correction apparatus using a plurality of ultrasonic motors, and a lens apparatus and an image pickup apparatus including the same.

Description of the Related Art

Hitherto, there is known a technology of driving a lens in a direction perpendicular to an optical axis of a lens system to reduce influences of camera shake occurring at the time of photographing a video image in a camera module including the lens system and an image pickup element, which is mounted in a camera for acquiring video images. In optical systems having the image stabilization function described above, the lens is required to be driven at high speed with high accuracy in the direction perpendicular to the optical axis. Therefore, a large number of image blur correction apparatus, each including a voice coil motor, have been proposed.

In this context, image blur correction apparatus using ultrasonic motors, each utilizing oscillations of an oscillator such as a piezoelectric element, have been proposed in recent years for the purpose of further enhancing the accuracy. Specifically, a plurality of ultrasonic motors are arranged to combine drives thereof such that a movable body can be moved in a two-dimensional direction, thereby realizing a two-dimensional driving apparatus. The thus realized two-dimensional driving apparatus is used for the image blur correction apparatus. As one of the image blur correction apparatus described above, the following configuration of the image blur correction apparatus has been proposed.

In Japanese Patent Application Laid-Open No. 2014-14256, a plurality of oscillators are fixed to a fixed barrel. A lens moving frame including a driven body is pressed against the oscillators to be brought into contact therewith from the above through intermediation of mechanical coupling, thereby transmitting driving forces of the oscillators to the lens moving frame.

The ultrasonic motor mechanically transmits the driving force. Therefore, as compared with the voice coil motor that transmits the driving force by using a magnetic force, high positional accuracy is required for the lens moving frame and the ultrasonic motors. In Japanese Patent Application Laid-Open No. 2014-14256, the oscillators are fixed on the fixed barrel in advance. Thereafter, the lens moving frame including the driven body is positioned with respect to the oscillators. Thus, it is inevitable to simultaneously perform a plurality of positioning operations that require high accuracy as described above, which prevents easy assembly.

Further, the oscillator included in the ultrasonic motor wears along with the use, and therefore characteristics of the image blur correction apparatus are lowered due to the wear. In such a case, the ultrasonic motor is required to be replaced or repaired. According to the configuration described in Japanese Patent Application Laid-Open No. 2014-14256, however, the ultrasonic motor cannot be directly removed. Therefore, it is inevitable that the image blur correction apparatus is disassembled to remove the lens moving frame, and then, a plurality of positioning operations are performed again after the replacement of the ultrasonic motor, which results in reduced ease of maintenance.

SUMMARY OF THE INVENTION

Therefore, the present invention has an object to provide an image blur correction apparatus that has a configuration in which ultrasonic motors can be individually removed such that the apparatus can be assembled without performing positioning adjustment for a plurality of ultrasonic motors at one time so as to improve ease of assembly, and that the ultrasonic motors can be removed without disassembling the image blur correction apparatus at the time of maintenance.

In order to achieve the above-mentioned object, a lens driving apparatus includes: an ultrasonic motor including a drive slider having an output shaft provided so as to project in a direction perpendicular to a driving direction of the drive slider; a lens moving frame configured to hold an optical system, and having a hole into which the output shaft is to be inserted; and a fixed portion configured to support the lens moving frame so that the lens moving frame is movable in a direction perpendicular to an optical axis, hold the ultrasonic motor so that the ultrasonic motor is removable from a side opposite to a side where the lens moving frame is provided, and have a through hole passing through the fixed portion in a direction of the optical axis.

According to the one embodiment of the present invention, there is provided the image blur correction apparatus having the configuration in which the ultrasonic motors can be individually removed, capable of being assembled without requiring positioning adjustment of the plurality of ultrasonic motors to be performed at one time to improve ease of assembly and allowing the ultrasonic motor to be removed without disassembling the image blur correction apparatus at the time of maintenance.

Further features of the present invention will become apparent from the following description of exemplary embodiments with reference to the attached drawings.

DESCRIPTION OF THE EMBODIMENTS

An exemplary embodiment of the present invention is hereinafter described in detail referring to the accompanying drawings.

Figure 1:
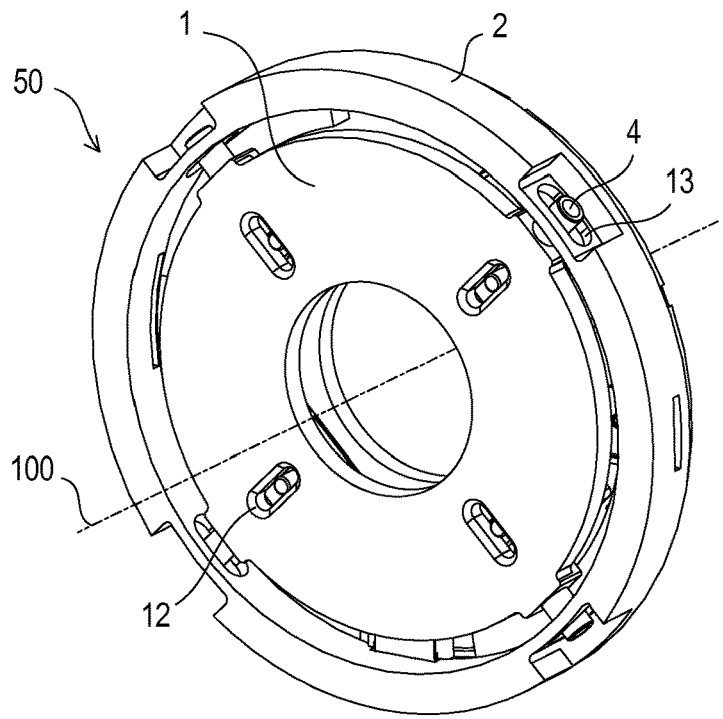
FIG. 1 is a perspective view of an image blur correction apparatus according to the present invention as viewed from an object side.
Figure 2:
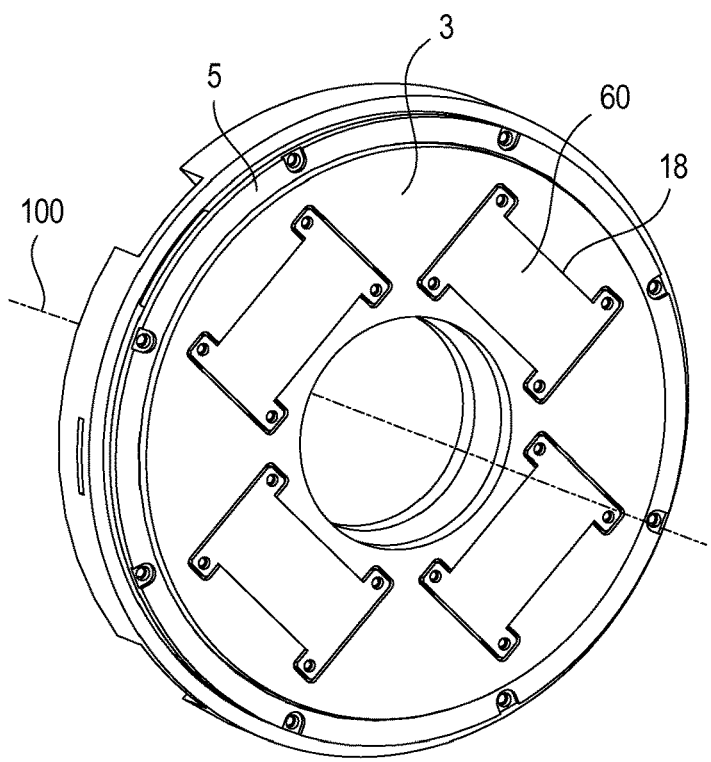
FIG. 2 is a perspective view of the image blur correction apparatus according to the present invention as viewed from an image pickup element side.
Figure 3:
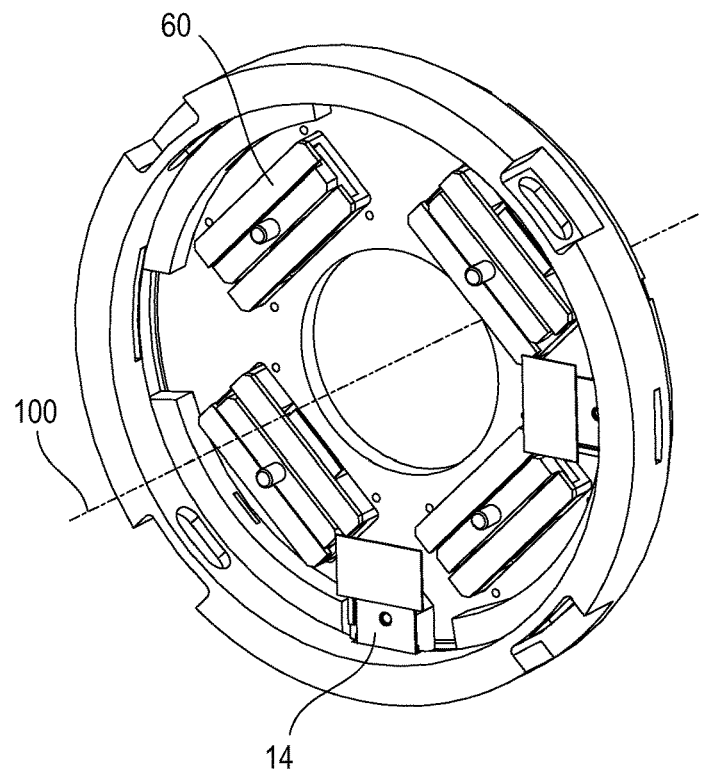
FIG. 3 is a perspective view of the image blur correction apparatus according to the present invention from which a lens moving frame is removed.
Figure 4:
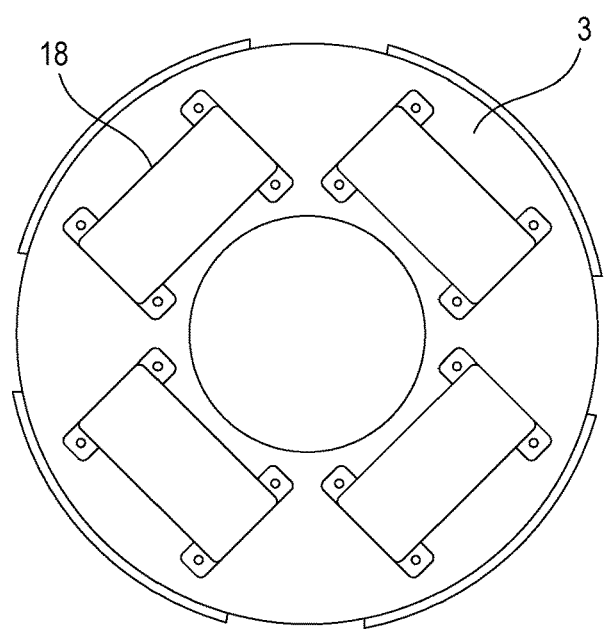
FIG. 4 is a front view of a motor mounting member of the image blur correction apparatus according to the present invention.
Figure 5:
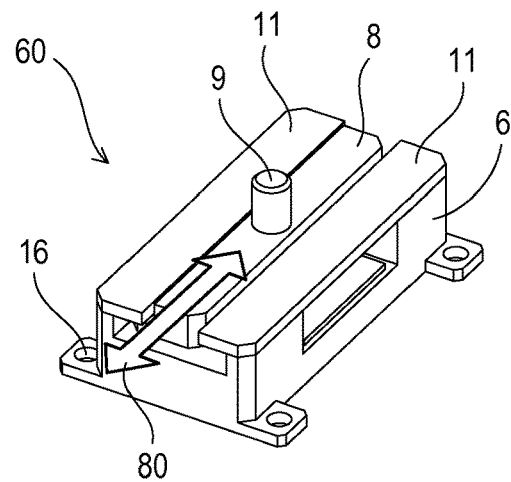
FIG. 5 is a perspective view of an ultrasonic motor arranged in the image blur correction apparatus according to the present invention.
Figure 6:
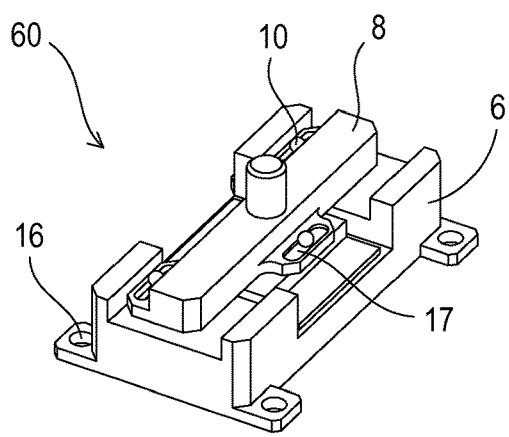
FIG. 6 is a perspective view of the ultrasonic motor of FIG. 5 from which fixed plates are removed.
Figure 7:
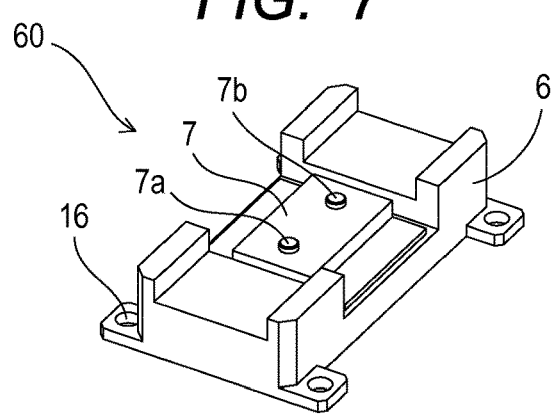
FIG. 7 is a perspective view of the ultrasonic motor of FIG. 6 from which a drive slider and balls are removed.

FIG. 1 is a perspective view of an image blur correction apparatus 50 according to an embodiment of the present invention as viewed from an object side. FIG. 2 is a perspective view of the image blur correction apparatus 50 according to this embodiment as viewed from an image pickup element side. FIG. 3 is a perspective view of the image blur correction apparatus 50 of FIG. 1 from which a lens moving frame 1 is removed as viewed from the object side. FIG. 5 is a perspective view of an ultrasonic motor 60 arranged in the image blur correction apparatus 50 according to this embodiment. FIG. 6 is a perspective view of the ultrasonic motor 60 obtained by removing fixed plates 11 from the ultrasonic motor 60 illustrated in FIG. 5. FIG. 7 is a perspective view of the ultrasonic motor 60 obtained by further removing a drive slider 8 and balls 10 from the ultrasonic motor 60 illustrated in FIG. 6.

Referring to FIG. 5, FIG. 6, and FIG. 7, the ultrasonic motor 60 arranged in the image blur correction apparatus 50 is described. A plurality of mounting holes 16 to be used for positioning adjustment of the ultrasonic motor 60, which is described later, are formed in a motor base 6 serving as a base. An oscillator 7 is fixed onto the motor base 6. On the top of the oscillator 7, the drive slider 8 is arranged so as to be held in contact with projections 7a and 7b of the oscillator 7. An output shaft 9 for transmitting a driving force to a lens moving frame 1 is provided to the drive slider 8 so as to project in a direction perpendicular to a driving direction 80 indicated by the arrow. A plurality of rolling grooves 17 in which the balls 10 roll are formed in the drive slider 8. The balls 10 are respectively arranged in the rolling grooves 17. The fixed plates 11 are arranged on the balls 10 to press the drive slider 8 against the projections 7a and 7b of the oscillator 7 through the balls 10 so that the drive slider 8 is in contact with the projections 7a and 7b. Then, the fixed plates 11 are fixed to the motor base 6 with screws (not shown). Although not shown, rolling grooves in which the balls 10 roll are also formed on rear sides of the fixed plates 11 so as to be opposed to the rolling grooves 17 of the drive slider 8. Due to a guiding function of the rolling grooves 17 and the balls 10, drive of the drive slider 8 is regulated in the driving direction 80 indicated by the arrow. A voltage is applied to the oscillator 7 by a voltage supply unit (not shown) to generate the driving force. As a result, the drive slider 8 is moved along the driving direction 80 indicated by the arrow by the above-mentioned guiding function.

Figure 2A:
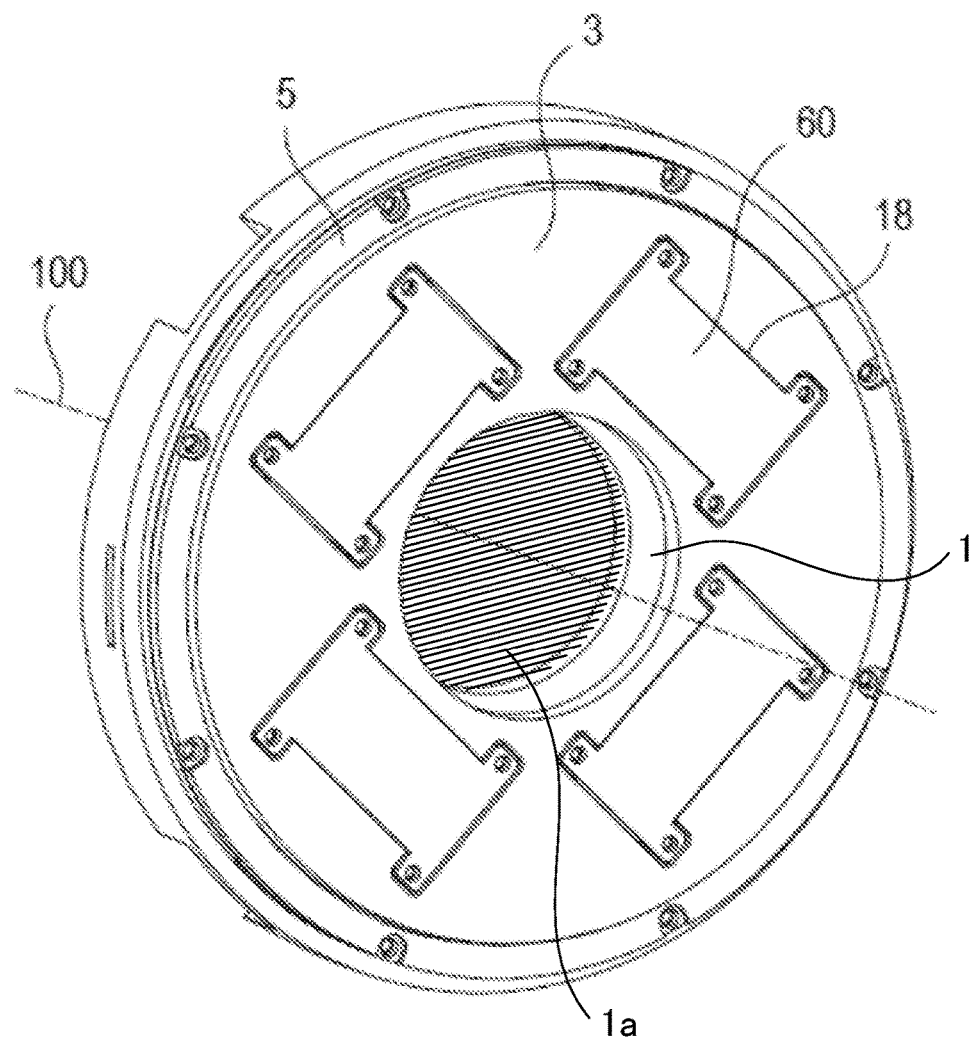
FIG. 2A is a perspective view of FIG. 2 with a lens.

Next, referring to FIG. 1, FIG. 2, FIG. 2A, FIG. 3, and FIG. 4, an image blur correction mechanism is described. An image blur correction lens group 1a is held by the lens moving frame 1, as illustrated in FIG. 2A. A plurality of elongated holes 12, each having a longitudinal direction within a plane perpendicular to an optical axis 100, are formed in the lens moving frame 1. The output shafts 9 for transmitting the driving forces of the ultrasonic motors 60 are slidably inserted (loosely inserted) into the elongated holes 12, respectively. In order to transmit the driving forces of the ultrasonic motors 60 with high efficiency, the output shafts 9 and the elongated holes 12 are fitted to each other in the insertion operation. Specifically, the output shaft 9 fitting into each of the elongated holes 12 is selected from the output shafts 9 having different diameters so that a clearance between the elongated hole 12 and the output shaft 9 falls within an allowable range. The ultrasonic motor 60 having the thus selected output shaft 9 is applied to each of the elongated holes 12. Encoders 14 configured to detect a position of the lens moving frame 1 within the plane perpendicular to the direction of the optical axis 100 are fixed to a fixed barrel 2. Although not shown, a scale is provided on a surface of the lens moving frame 1 so as to be opposed to the encoders 14. A plurality of circumferential grooves 13 are formed in the fixed barrel 2 about the optical axis 100 to restrict the movement of the lens moving frame 1 in the direction of the optical axis 100 and support the lens moving frame 1 so that the lens moving frame 1 is freely movable within the plane perpendicular to the direction of the optical axis 100. A plurality of cam followers 4 to be brought into engagement with the circumferential grooves 13 formed in the fixed barrel 2 are provided on the lens moving frame 1 about the optical axis 100.

A motor mounting member 3 is inserted into the fixed barrel 2, and is fixed to the fixed barrel 2 with screws (not shown) through a keep plate 5 so as to be removable from a side that does not face the lens moving frame 1 in the direction of the optical axis 100. The ultrasonic motors 60 are inserted into adjustment holes (through holes) 18 formed in a mounting portion of the motor mounting member 3 from the side that does not face the lens moving frame 1 in the direction of the optical axis 100, and are then fixed to the motor mounting member 3 so as to be removable therefrom. Each of the adjustment holes 18 is formed so as to have a clearance with respect to an outer shape of the ultrasonic motor 60. Positioning of the output shafts 9 of the ultrasonic motors 60 can be adjusted with respect to the elongated holes 12 of the lens moving frame 1 by using the clearances, which is described later. The ultrasonic motors 60 are fixed onto the motor mounting member 3 illustrated in FIG. 4, as illustrated in FIG. 3. A combination of drives of the four ultrasonic motors 60 enables two-dimensional drive of the lens moving frame 1 within the plane perpendicular to the direction of the optical axis 100. An acceleration sensor and a control portion are further provided to the above-mentioned structure to form the image blur correction apparatus.

Figure 8:
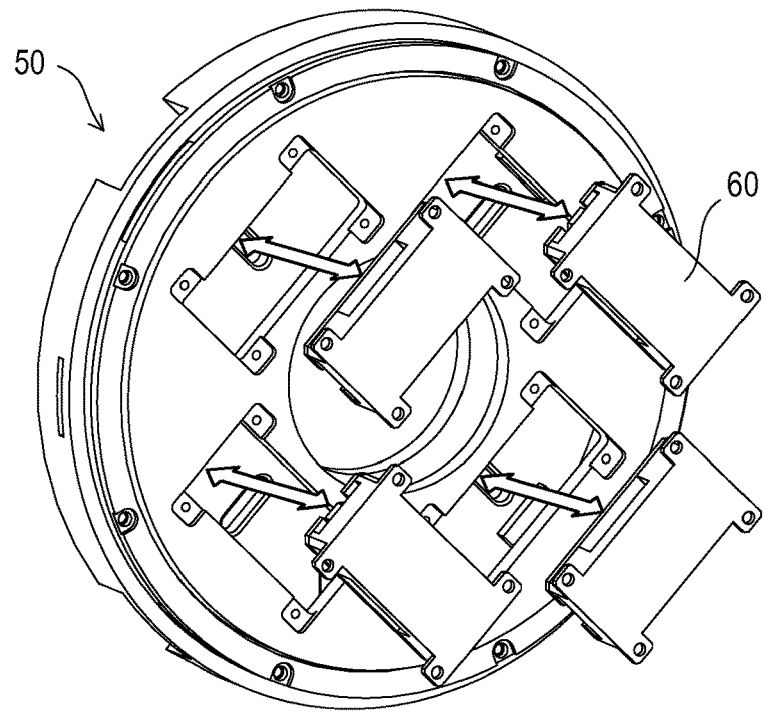
FIG. 8 is a perspective view of the image blur correction apparatus according to the present invention from which the ultrasonic motors are individually removed.
Figure 9:
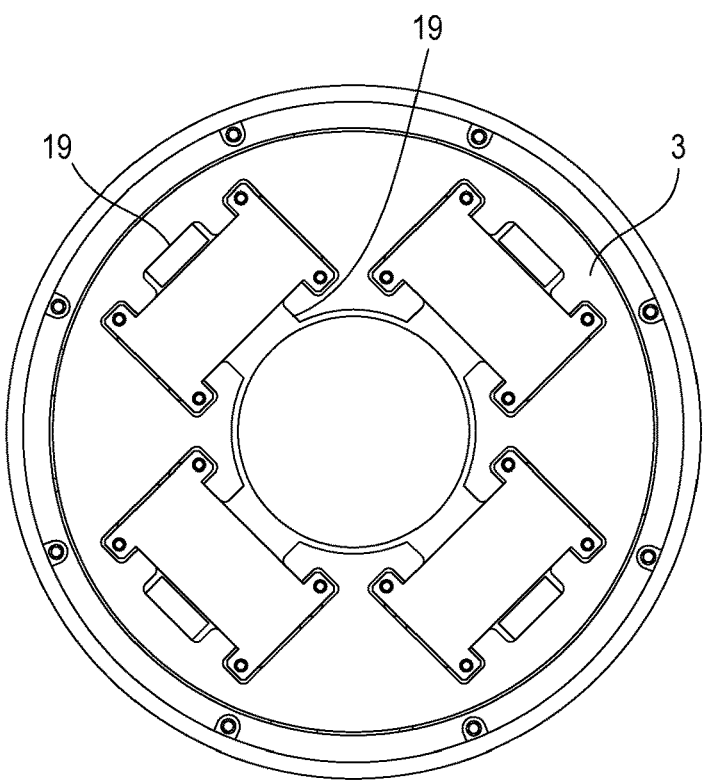
FIG. 9 is a view of the image blur correction apparatus according to the present invention when the motor mounting member includes cutouts.
Figure 10:
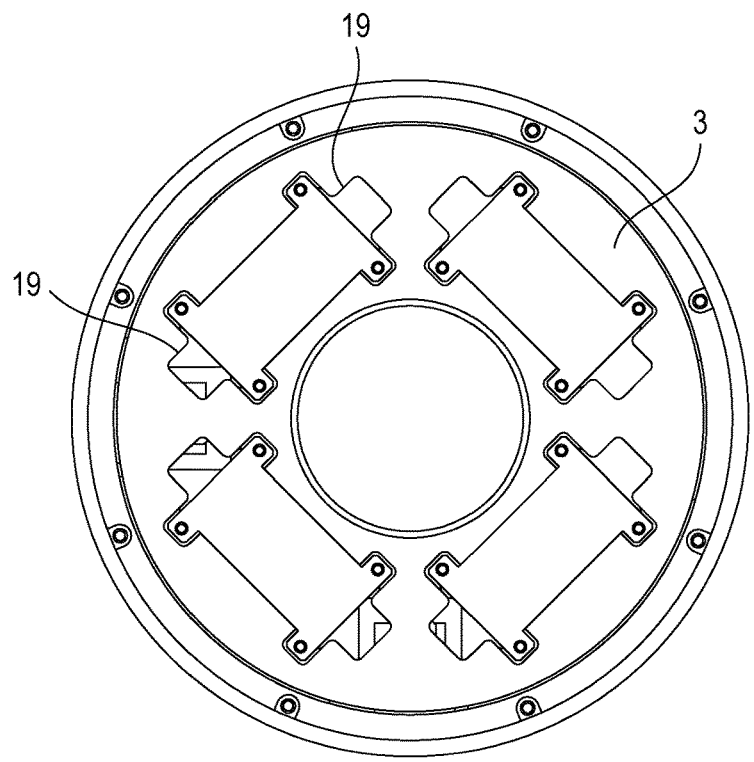
FIG. 10 is another view of the image blur correction apparatus according to the present invention when the motor mounting member includes cutouts.

The positioning adjustment of the ultrasonic motors 60 is now described. The positioning adjustment is carried out in a state in which the cam followers 4 provided on the lens moving frame 1 and the circumferential grooves 13 formed in the fixed barrel 2 are engaged with each other and the motor mounting member 3 is fixed to the fixed barrel 2. The adjustment holes 18 into which the ultrasonic motors 60 are to be inserted are formed in the motor mounting member 3. As described above, each of the adjustment holes 18 is formed with a larger size than that of the outer shape of each of the ultrasonic motors 60. The plurality of mounting holes 16, each having a larger diameter than a diameter of each of the screws for fixing the ultrasonic motors 60, are formed in the motor base 6 of the ultrasonic motor 60. The lens moving frame 1 is arranged so that a center of the lens moving frame 1 is approximately matched with the optical axis 100, and the output shaft 9 of each of the ultrasonic motors 60 is arranged so as to be located approximately at a center of a drive range of the ultrasonic motor 60. The ultrasonic motors 60 are inserted into the adjustment holes 18. Then, after the positions of the ultrasonic motors 60 are finely adjusted by using the clearances of the adjustment holes 18 and the clearances of the mounting holes 16, the output shafts 9 are brought into engagement with the elongated holes 12 by selecting the output shaft 9 for each of the elongate holes 12 as described above. Thereafter, the ultrasonic motors 60 are fixed to the motor mounting member 3 by screws (not shown). In Japanese Patent Application Laid-Open No. 2014-14256, a plurality of oscillators are fixed to a fixed barrel in advance. Thereafter, a lens moving frame including a driven body is arranged. Therefore, the oscillators and the driven body are required to be positionally adjusted (positioned) at one time for a plurality of positions. With the structure proposed in the present invention, however, the ultrasonic motors 60 can be individually removed from the image blur correction apparatus 50, as illustrated in FIG. 8. The ultrasonic motors 60 can be positioned individually, thereby improving ease of assembly. Further, as illustrated in FIG. 9 and FIG. 10, cutouts (enlarged through holes) 19 may be formed in parallel to or in a perpendicular direction to the driving direction of the drive slider 8 of each of the ultrasonic motors 60 so as to be adjacent to the adjustment holes 18 formed in the motor mounting member 3. The formation of the cutouts 19 allows, when the ultrasonic motors 60 are positioned after the insertion of the ultrasonic motors 60 into the adjustment holes 18, a finger or a tool to be inserted into the cutout 19 in a state in which the ultrasonic motor 60 is inserted into the adjustment hole 18, to thereby finely adjust the position of the ultrasonic motor 60. Thus, the ease of assembly is further improved.

Figure 11:
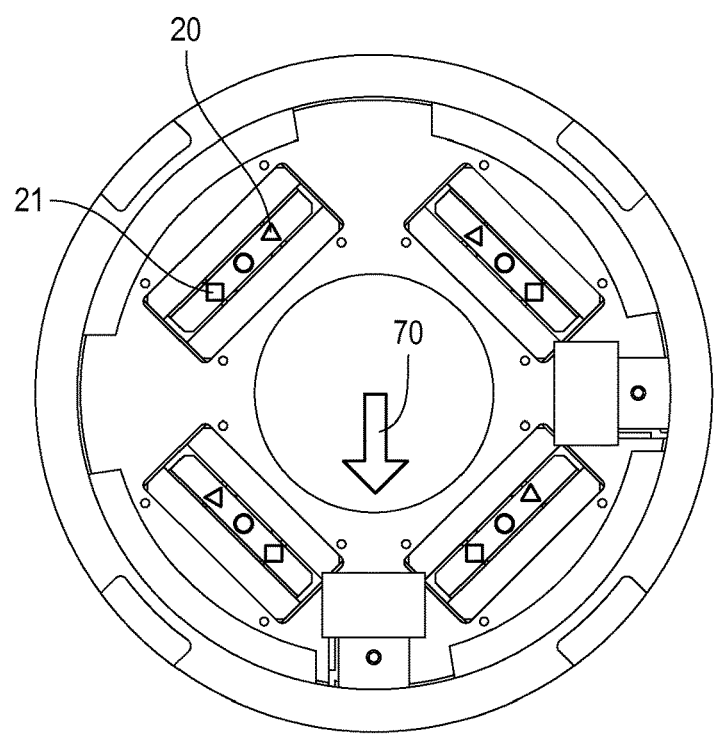
FIG. 11 is an explanatory diagram for illustrating influences in a direction of a gravity force on the image blur correction apparatus and the ultrasonic motors.
Figure 12:
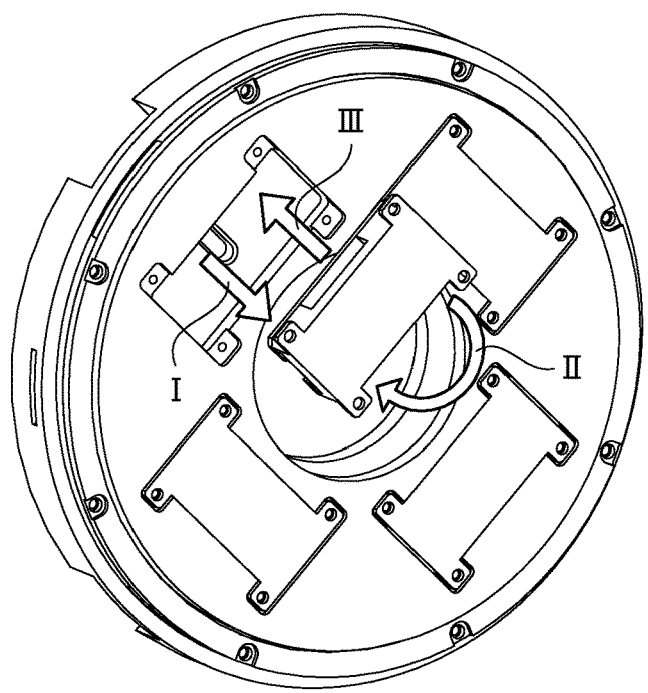
FIG. 12 is a diagram for illustrating a maintenance method for one ultrasonic motor.
Figure 13:
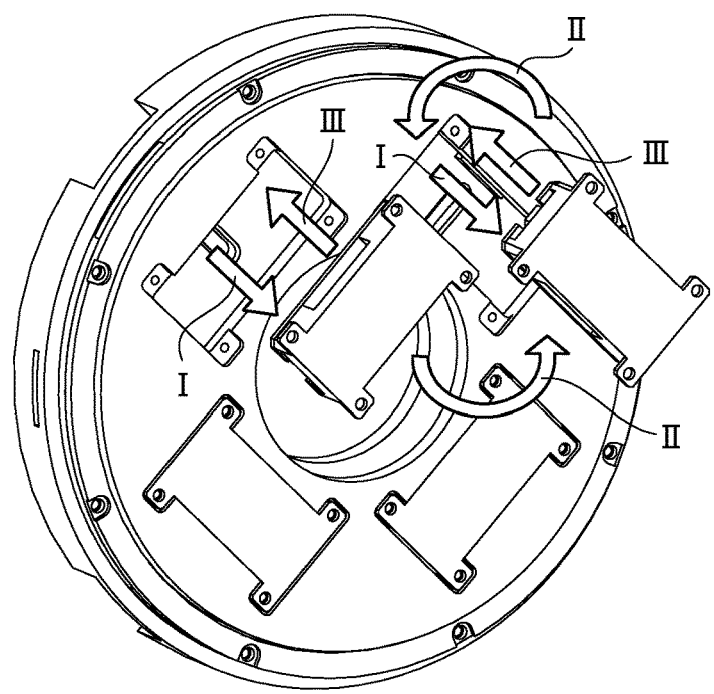
FIG. 13 is a diagram for illustrating a maintenance method for two ultrasonic motors.

A maintenance method for the ultrasonic motors is now described referring to FIG. 11, FIG. 12, and FIG. 13. A triangle 20 and a rectangle 20 illustrated in FIG. 11 respectively indicate the corresponding positions of the projections 7a and 7b of the oscillator 7 of each of the ultrasonic motors 60. As described above in "Description of the Related Art" section, it is known that the projections 7a and 7b of the oscillator 7 wear along with use because the drive portion and the driven portion of the ultrasonic motor 60 are pressed to be brought into contact with each other. Therefore, when characteristics of the image blur correction apparatus 50 are lowered due to the wear of the oscillator 7, the ultrasonic motor 60 is required to be replaced or repaired. One of the characteristics of the image blur correction apparatus 50 lies in its use within the plane perpendicular to the direction of the optical axis 100. Therefore, the image blur correction apparatus 50 is constantly subjected to a gravity force 70. As a result, the ultrasonic motors 60 arranged as illustrated in FIG. 11 are subjected to the gravity force 70 as well, and hence forces exerted on the projections 7a and 7b (20 and 21) of the oscillator 7 differ from each other depending on the driving direction of the reciprocating operation. Therefore, the amounts of wear of the projections 7a and 7b (20 and 21) differ from each other.

Each of the ultrasonic motors 60 included in the image blur correction apparatus 50 according to the present invention has a configuration for improving ease of maintenance so as to cope with the wear characteristics described above. Specifically, each of the ultrasonic motors 60 has a configuration that allows the ultrasonic motor 60 to be mounted into the adjustment hole 18 in the same manner even after the ultrasonic motor 60 is rotated at 180° within the plane of the motor mounting member 3 (namely, the plane perpendicular to the direction of the optical axis 100). Specifically, the ultrasonic motor 60 can be mounted into the single adjustment hole 18 in the same manner even after the ultrasonic motor 60 is rotated at 180° within the plane of the motor mounting member 3 (namely, the plane perpendicular to the direction of the optical axis 100). In addition, a positional range in which the ultrasonic motor 60 is driven by the drive slider 8 remains unchanged. Further preferably, a position of the center of the output shaft 9 remains unchanged even after the ultrasonic motor 60 is rotated at 180°. According to the configuration described above, at least the positions of the mounting holes 16 of the ultrasonic motor 60 may be formed to have rotational symmetry at 180° so that the positions of the mounting holes 16 form a rectangle or a parallelogram when being connected to each other. Further, when the positions of the mounting holes 16 of the ultrasonic motor 60 are not formed to have rotational symmetry at 180°, the same effects can be enjoyed by forming corresponding screw holes in the motor mounting member 3 such that the ultrasonic motor 60 can be fixed to the motor mounting member 3 at a position where the driving direction 80 of the drive slider 8 has rotational symmetry at 180°.

For the image blur correction apparatus 50 having the configuration described above according to the present invention, the following maintenance methods for the ultrasonic motors 60 can be realized. FIG. 12 is a view for illustrating a maintenance method for the single ultrasonic motor 60. The characteristics are lowered due to the wear of the oscillator. Then, the ultrasonic motor 60 requiring maintenance is removed from the motor mounting member 3, as indicated by the arrow I. Then, the ultrasonic motor 60 is rotated at 180° about the output shaft 9, as indicated by the arrow II. As a result, a relationship between the projections 7a and 7b (20 and 21) of the oscillator 7 in the direction of the gravity force 70 is reversed. Then, the ultrasonic motor 60 is mounted onto the motor mounting member 3 again, as indicated by the arrow III. FIG. 13 is a view for illustrating a maintenance method for two adjacent ones of the ultrasonic motors 60. Similarly to the case of the maintenance of the single ultrasonic motor 60, the ultrasonic motors 60 requiring maintenance are removed from the motor mounting member 3, as indicated by the arrows I. Then, after each of the removed ultrasonic motors 60 is rotated at 90° about the output shaft 9, the mounting positions are interchanged (the relationship between the projections 7a and 7b (20 and 21) in the direction of the gravity force 70 is reversed), as indicated by the arrows II. The ultrasonic motors 60 are mounted onto the motor mounting member 3, as indicated by the arrows III. Although the maintenance methods for up to two ultrasonic motors are only described in the embodiment, the above-mentioned methods are used even for maintenance of three or more ultrasonic motors. In a case where the characteristics are lowered under the influences of the wear of the oscillator, the above-mentioned methods are carried out so that an increased lifetime of the ultrasonic motors can be realized without replacing the ultrasonic motor with a new one. Further, the replacement and maintenance of the ultrasonic motor can be implemented without disassembling the image blur correction apparatus.

In the embodiment described above, there is exemplarily described the configuration that includes the fixed barrel to be fixed to the lens apparatus, and is configured to support the lens moving frame so as to be movable within the plane perpendicular to the optical axis, and the motor mounting member fixed to the fixed barrel, including the mounting portion to which the ultrasonic motors are fixed so as to be removable from the side that does not face the lens moving frame, and which has the through holes passing therethrough in the direction of the optical axis. However, the present invention is not limited to the above-mentioned configuration. The same effects of the present invention can be obtained even when the fixed barrel and the motor mounting member are formed integrally as a fixed portion.

By configuring a lens apparatus including the image blur correction apparatus of the present invention, there can be realized the lens apparatus that enjoys the effects of improving the ease of maintenance at the time of maintenance of the ultrasonic motors and not requiring the replacement of the ultrasonic motor with a new one, when the characteristics are lowered under the influences of the wear of the oscillator, thereby being capable of realizing an increased lifetime of the ultrasonic motors.

Further, by configuring an image pickup apparatus including the lens apparatus including the image blur correction apparatus of the present invention and an image pickup element for receiving light from the lens apparatus, the image pickup apparatus excellent in ease of maintenance, which has the functions and effects of the present invention, can be realized.

The exemplary embodiment of the present invention is described above, but the present invention is not limited to the embodiment and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-214302, filed Oct. 21, 2014, which is hereby incorporated by reference herein in its entirety.

What is claimed is:

1. A lens apparatus comprising:
a lens;
a moving frame holding the lens;
an ultrasonic motor configured to drive the moving frame; and
a fixed portion in which a through hole is formed along a direction of an optical axis of the lens, the fixed portion supporting the moving frame so that the moving frame is movable in a direction perpendicular to the direction of the optical axis, the fixed portion holding the ultrasonic motor in the through hole so that the ultrasonic motor drives the supported moving frame in a first side, with respect to the fixed portion along the direction of the optical axis, where the moving frame is provided, and that the ultrasonic motor is removable from a second side, with respect to the fixed portion along the direction of the optical axis, opposite to the first side.

2. The lens apparatus according to claim 1, wherein:
the moving frame has an elongated hole, and
the ultrasonic motor has an output shaft slidably inserted into the elongated hole so that the moving frame is movable along an elongated direction of the elongated hole.

3. The lens apparatus according to claim 2, wherein the through hole is enlarged in the moving frame in one of a driving direction of the ultrasonic motor or a direction perpendicular to the driving direction of the ultrasonic motor to enable a fine adjustment of a position of the ultrasonic motor.

4. The lens apparatus according to claim 1, wherein:
the ultrasonic motor includes an oscillator having two projections extending along the driving direction of the drive slider; and
the ultrasonic motor has an output shaft and is configured to rotate 180° with respect to the output shaft to mount to the fixed portion.

5. The lens apparatus according to claim 1, wherein the fixed portion comprises:
a fixed barrel supporting the moving frame so that the moving frame is movable in the direction perpendicular to the direction of the optical axis; and
a motor mounting member fixed to the fixed barrel and having the through hole extending along the direction of the optical axis.

6. The lens apparatus according to claim 1, further comprising a controller configured to control the ultrasonic motor to stabilize an image formed by the lens apparatus.

7. An image pickup apparatus comprising:
a lens apparatus
an image pickup element configured to receive light from the lens apparatus,
wherein the lens apparatus comprises:
a lens;
a moving frame holding the lens;
an ultrasonic motor configured to drive the moving frame; and
a fixed portion in which a through hole is formed along a direction of an optical axis of the lens, the fixed portion supporting the moving frame so that the moving frame is movable in a direction perpendicular to the direction of the optical axis, the fixed portion holding the ultrasonic motor in the through hole so that the ultrasonic motor drives the supported moving frame in a first side, with respect to the fixed portion along the direction of the optical axis, where the moving frame is provided, and that the ultrasonic motor is removable from a second side, with respect to the fixed portion along the direction of the optical axis, opposite to the first side.

8. A driving apparatus comprising:
a moving portion;
an ultrasonic motor configured to drive the moving portion; and
a fixed portion in which a through hole is formed, the fixed portion supporting the moving portion so that the moving portion is movable in a direction perpendicular to a direction of an axis of the through hole, the fixed portion holding the ultrasonic motor in the through hole so that the ultrasonic motor drives the supported moving portion in a first side, with respect to the fixed portion along the direction of the axis, where the moving portion is provided, and that the ultrasonic motor is removable from a second side, with respect to the fixed portion along the direction of the axis, opposite to the first side.

9. An optical apparatus comprising:
an optical member; and
the driving apparatus according to claim 8,
wherein the moving portion holds the optical member.

10. The optical apparatus according to claim 9, wherein the optical member includes an image pickup element.

* * * * *